Aug. 2, 1966 R. H. LAGARDE 3,263,289
COUPLING DEVICE FOR WOVEN BANDS
Filed Feb. 19, 1965 5 Sheets-Sheet 1
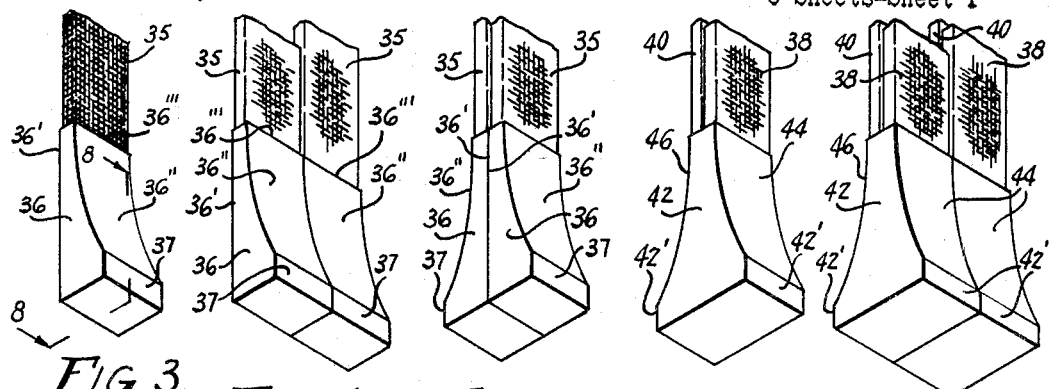
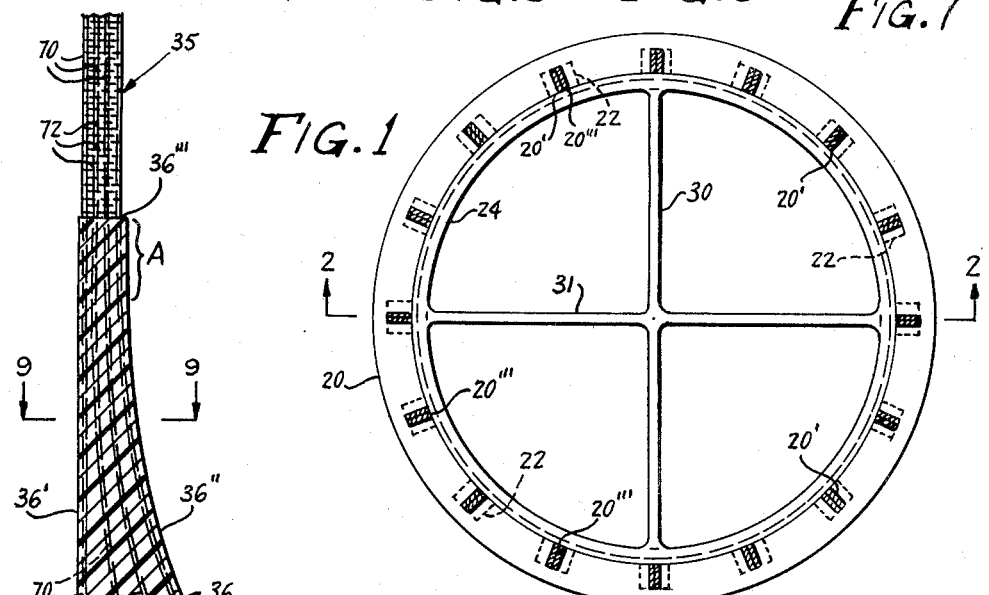
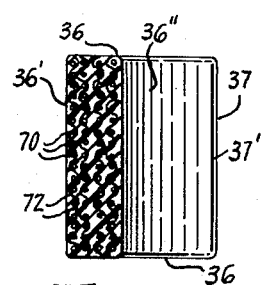
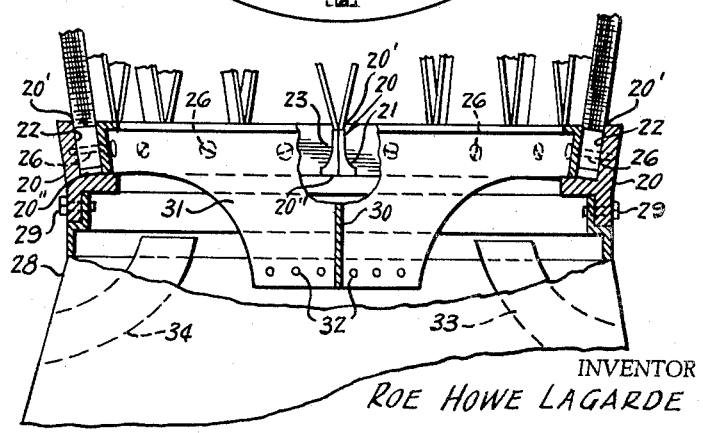
INVENTOR
ROE HOWE LAGARDE
BY J. Wesley Everett
ATTORNEY.

Aug. 2, 1966   R. H. LAGARDE   3,263,289
COUPLING DEVICE FOR WOVEN BANDS
Filed Feb. 19, 1965   5 Sheets-Sheet 2

INVENTOR
ROE HOWE LAGARDE

BY J. Wesley Everett
ATTORNEY.

FIG. 15
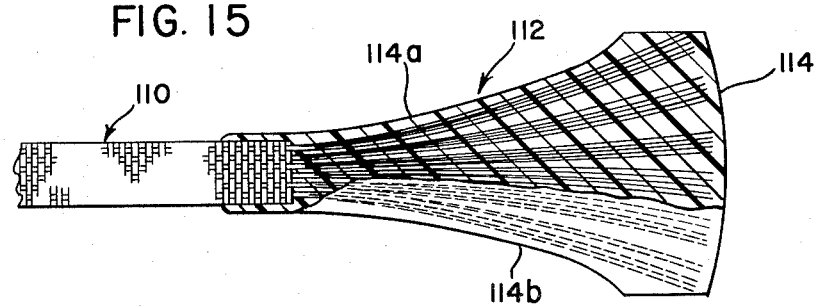
FIG. 16
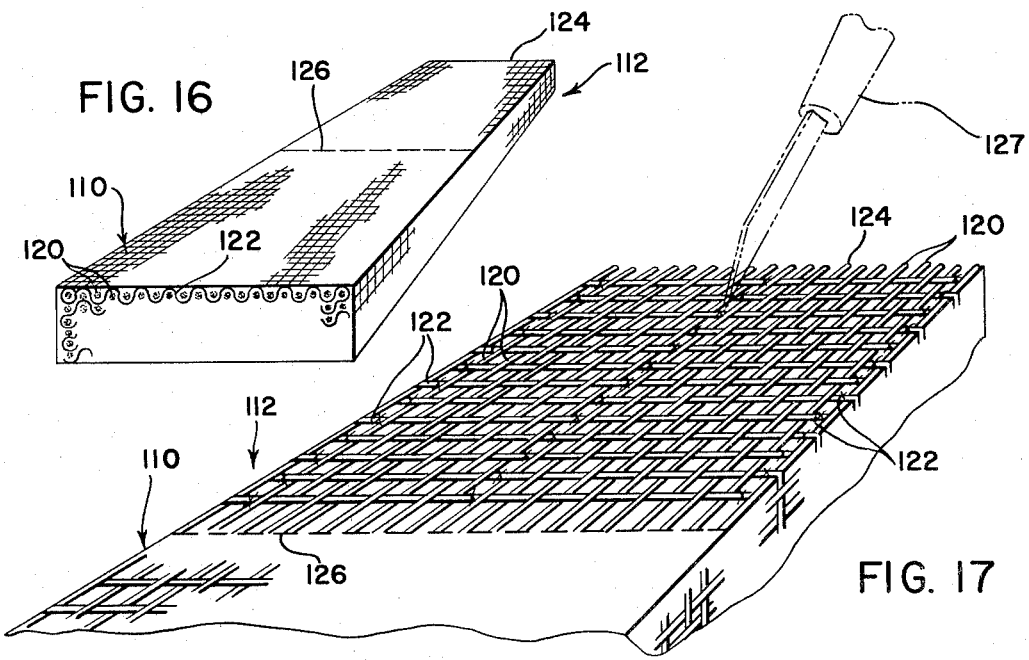
FIG. 17
FIG. 18
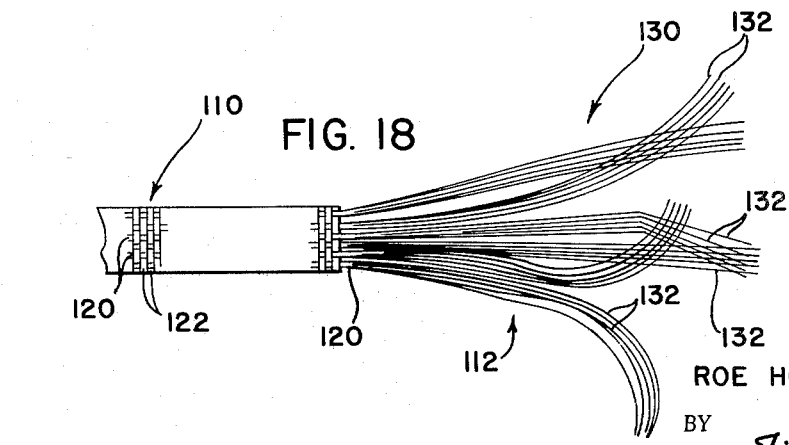
INVENTOR
ROE HOWE LAGARDE
BY
*Tilberry & Body*
ATTORNEYS Aug. 2, 1966     R. H. LAGARDE     3,263,289
COUPLING DEVICE FOR WOVEN BANDS
Filed Feb. 19, 1965     5 Sheets-Sheet 5
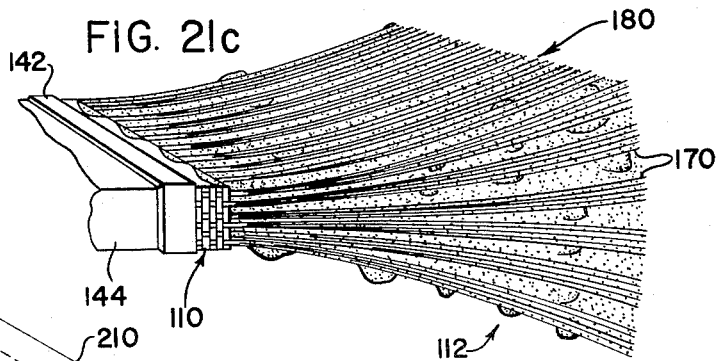
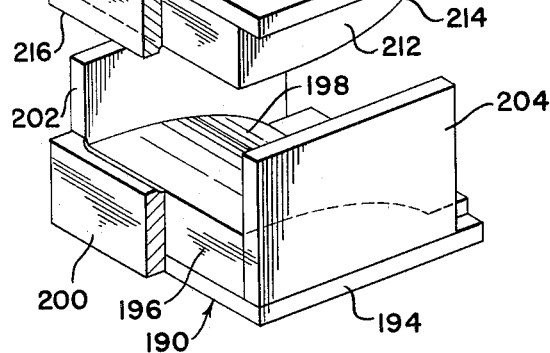
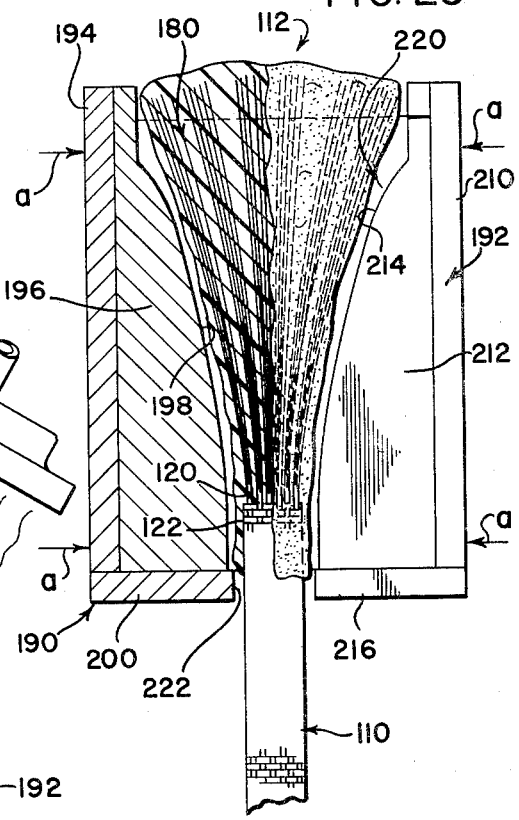
INVENTOR
ROE HOWE LAGARDE
BY
*Tilberry & Body*
ATTORNEYS United States Patent Office 3,263,289
Patented August 2, 1966

3,263,289
COUPLING DEVICE FOR WOVEN BANDS
Roe Howe Lagarde, Talbot County, Md., assignor to E. W. Bliss Company, Canton, Ohio, a corporation of Delaware
Filed Feb. 19, 1965, Ser. No. 438,459
7 Claims. (Cl. 24—123)

This application is a continuation-in-part application of my copending application S.N. 286,047, filed June 6, 1963 now abandoned, which is in turn a continuation-in-part application of my copending application S.N. 279,672 filed May 9, 1963, now abandoned, which was in turn a continuation-in-part application of my copending application S.N. 154,011 filed November 21, 1961, now abandoned, which was in turn a continuation-in-part application of my copending application S.N. 83,442 filed January 18, 1961, now abandoned.

The present invention relates primarily to a band attaching device for holding the ends of flexible cords or woven bands and for attaching the same to an object to be suspended thereby and to the method of making this device.

This construction is particularly designed to hold the ends of flexible bands such as parachute strands, but is not to be limited thereto, wherein the bands are provided with a lug at the ends thereof as set forth in detail in two of my prior patent applications. These lugs are generally formed from an organic plastic material, and when allowed to fully set are in a substantially rigid form with a slight built-in resiliency.

In accordance with the present invention, there is provided a device for coupling a flat tape, including a plurality of longitudinally and transversely extending strands, onto a support member. This device includes a coupling member having a cavity with diverging side walls terminating at the converging ends of the side walls in a slot-like opening; means for mechanically securing the coupling member onto the support member; the longitudinally extending strands being unwoven from the transversely extending strands adjacent one end of the tape; a plastic lug molded around the unwoven longitudinally extending strands with the longitudinally extending strands being distributed throughout the lug; the lug having a transverse cross section with diverging side walls generally matching the diverging side walls of the cavity; and, the lug being received in the cavity with the side walls of the lug bearing against the side walls of the cavity and the tape extending through the cavity opening.

By using the structure defined above, the unwoven longitudinal strands of the tape are evenly distributed throughout the molded lug while the transversely extending strands are removed. This gives homogeneous distribution of the longitudinally extending strands and greatly increases the maximum holding force of the coupling device.

The primary object of the invention is to provide a novel and quick way of attaching bands to an object.

Another object of the invention is to provide a novel way of securing the ends of two or more bands within a single cavity, or part carried by the device.

A further object of the invention is the novel manner in which the plastic lug is secured to the flexible bands.

While several objects of the invention have been pointed out other objects will become apparent as the nature and use of the invention becomes more apparent from the specification with reference to the accompanying drawings.

The invention is illustrated in the following drawings, in which:

FIGURE 1 is a plan view of one form of the attaching device.

FIGURE 2 is a fragmentary sectional view taken along line 2—2 of FIGURE 1 illustrating a manner of securing the band attaching means to a capsule, or the tail end of an airplane for braking the same.

FIGURE 3 is a perspective view of a single curved face tapered lug to be used in the end of the band for securing the same to the band attaching device.

FIGURE 4 is a perspective view similar to that shown in FIGURE 3 wherein two separate lugs are used side by side in a single cavity.

FIGURE 5 is a perspective view similar to that shown in FIGURE 4 wherein the lugs are placed back to back.

FIGURE 6 is a perspective view illustrating a single double curved face tapered lug attached to the end of two bands.

FIGURE 7 is a perspective view similar to FIGURE 6 wherein two single double curved face tapered lugs are used side by side.

FIGURE 8 is an enlarged sectional view taken on line 8—8 of FIGURE 3.

FIGURE 9 is a sectional view taken along line 9—9 of FIGURE 8.

FIGURE 15 is a partial cross sectional view illustrating a further modification of the present invention;

FIGURE 16 is a partial pictorial view showing a step in the method of forming a lug on the end of a woven tape;

FIGURE 17 is an enlarged pictorial view showing, somewhat schematically, another step in the method of forming a lug;

FIGURE 18 is a side elevational view showing a further step in the method of forming a lug;

FIGURES 21a, 21b and 21c are pictorial views showing, progressively another step in the method of forming a lug;

FIGURE 22 is an exploded, pictorial view showing the mold used in the method of forming a lug;

FIGURE 23 is a side elevational view showing another step in the method of forming a lug; and, FIGURE 24 is a side elevational view showing the final step in the method of forming a lug.

Like character references are used to point out like and similar parts throughout the several views.

Figure 12:
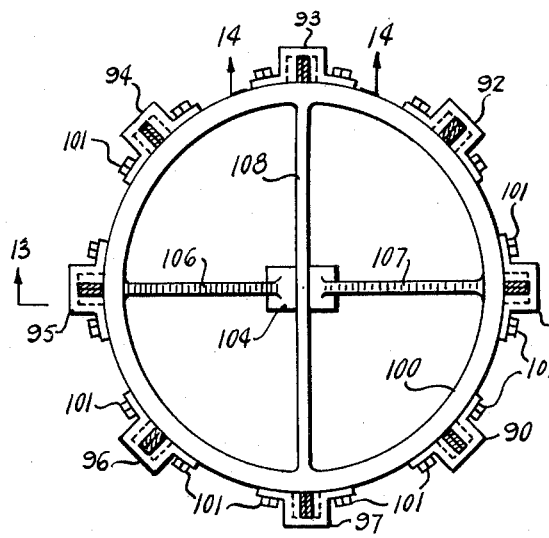
FIGURE 12 is a view of a still further modified form of the attaching device.

Referring in particular to FIGURES 1 and 2 the attaching means comprises a rigid lug supporting element in the form of ring 20 which is provided with a plurality of lug receiving cavities 22. Each cavity is integrally formed within the ring with curved tapered ends and is open at its upper end 20′, the bottom 20″ of the cavity 20 is closed by being integrally formed in the ring, as shown in FIGURE 2, or the bottom may be closed by a separate element (not shown) or any other suitable means.

The cavity 20 shown particularly in FIGURE 2, is provided with two opposite tapered end walls 21 and 23 and is adapted for use with the type of lug shown in FIGURES 3 and 5, wherein the lug is provided with one straight end wall and the lugs are placed in the cavity back to back. The inner side 20''' of the cavity is open and is closable by a second ring 24. For convenience the tapered walls and the wall opposite a tapered wall are referred to as end walls and the opposite parallel walls are referred to as side walls. The ring 24 is secured to the ring 20 by bolts or studs 26. The ring 20 is shown in FIGURE 2 attached to a capsule or other object 28 to be suspended by means of bolts 29. In order to better secure the attaching means to the suspended object, a means such as plates 30 and 31 are carried by the ring 24 which is also attached to the object 30 by means such as bolts or studs adapted to extend through the openings 32. The attaching device as shown in FIGURES 1 and 2, being of ring formation normally has a hollow center, which allows for the passage of air therethrough. In case the top of the suspended object is provided with a closed top, conduits 33 and 34 are provided to convey air toward the center of the ring for better operation of the parachutes. These conduits may be provided with controls (not shown) to regulate the air admitted therethrough.

The lugs may be formed in various ways. One form is shown in FIGURE 3 wherein the lug 36 is formed on the end of a single band 35 the lug having one straight end portion 36' and a curved tapered end portion 36''. This form may be used side by side in the same lug receiving cavity as shown in FIGURE 4 or they may be used back to back as shown in FIGURE 5.

The lugs may be formed as shown in FIGURE 6 wherein two bands 38 and 40 are placed in a single lug 42. The lug 42 is formed with double curved tapered end faces 44 and 46. The lug receiving means, or cavity may be of such dimension as to receive a single lug, as shown in FIGURE 6, or two lugs as shown in FIGURE 7.

The general structure and formation of the several lugs are quite similar, their shape depends to a large extent upon the particular use and manner in which they are to be employed together with their practical application to a particular use and the economy in their construction.

The combination lug and woven cord or band structure is of importance to the extent, that the band must be tied to the lug in such a manner as to assure complete attachment between the two. The method of forming the lugs onto the band will be hereinafter described in detail. Referring to the arrangement of the woven cord or band, each must be unravelled from some distance from its end. This unravelled portion extends substantially throughout the curved portion of the lug and preferably for a further distance toward the smaller end of the lug. The unwoven strands are extended outwardly toward the end of the cord, or band substantially parallel with the elongated axes of the cord or band, as shown at 70 in FIGURE 8 and spread throughout the area to be occupied by the lug. The plastic material from which the lug is to be formed is then injected about the spread strands, which are held within a suitable mold (not shown) or in the cavity in which the lug will be secured. In forming the lug it is preferable to form a heavy outer end or bottom portion, as shown at 37 in FIGURES 3 to 5 and at 42' in FIGURES 6 and 7, sometimes referred to as a head, to back up the pressure being exerted on the curved faces of the lug to prevent the lug from being drawn too far into the neck, or smaller end of the cavity whenever the band is under extreme heavy tension.

Referring in particular to the band shown in FIGURES 3 and 8, the band is woven with lateral or weft strands 72 and longitudinal or warp strands 70. The end of the band is unbraided, or unwoven by removing the lateral, or weft strands 72 for at least a distance throughout the curved end surfaces of the lug, and preferably to a line adjacent the narrow end 36''' of the lug. There is no limit to the length of the longitudinal strands 70, and if desired may extend from the end of the woven portion adjacent the small end of the lug outwardly to and including the outer enlarged end 37 of the lug.

The material used in construction of the lug is preferably of a semi-liquid of solidifiable organic plastic type. However, other suitable substances may also be used, such as, cement, rubber, epoxy, etc. Nor is the substance to be limited to a solidifiable liquid, or semi-liquid, but may be of a granular material to which heat and pressure may be applied for solidification, or a solidifying agent may be added to the material within the mold fixture, depending on the method desired. This solidifying substance is compounded to solidify into a solid or semi-solid lug, filling the spaces between the strands 70 and adhering to the strands themselves to form a rigid or semi-rigid mass. It has been found in tests, that if the lug is slightly resilient its holding qualities are a great deal better. However, the lug must be of such solidity as to be held within the cavity, when the band is under extreme heavy tension.

In the form of lug 36, shown in FIGURES 3, 4, 5 and 8 the lug is provided with one straight end 36' and a curved surface 36'', the lateral sides of the lug being in parallel planes. The advantage of this particular form, is that, two bands may be enclosed in a single cavity, which is more economical and at the same time both bands will get substantially the same holding power within the one cavity. Whether the lug is provided with a single or double curved tapered face, the curved face portions have substantially the same degree of curvature.

Referring further to FIGURES 3 and 8, the tapered curved face portion of the lug is shown being in the form of a gradual concaved surface 36''. Beginning with a portion A, which is substantially parallel with the extending woven band portion 35, adjacent the neck end 36''' of the lug, the concaved portion 36'' extends from the outer end of the portion A to the line 37', the inner edge of the head portion 37. The head portion 37 may vary slightly in thickness depending upon the amount of stress it will be required to carry. The degree of curvature of the curved surface of the lug gradually increased as the surface is extended from the inner end of the parallel portion A to the line 37' adjacent the head 37. By making the lug of a slightly resilient material the parallel portion A will not receive the high pressure to which the tapered surfaces are subjected which will reduce the compression in the neck area and allow for a slight movement of the portion A and reduce compression on the strands embedded therein and allow the remainder of the lug including the curved surface of the lug carrying the extended ends of the warp strands to progressively take up the load. This particular configuration of the lug including the curved face allows for a minimum holding of the strands in the neck area of the lug, which has herebefore had a tendency to break at this point.

Figure 10:
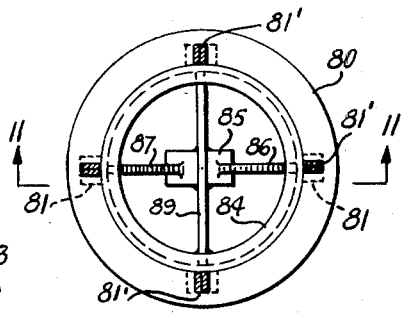
FIGURE 10 is a plan view of a modified form of the attaching device.
Figure 11:
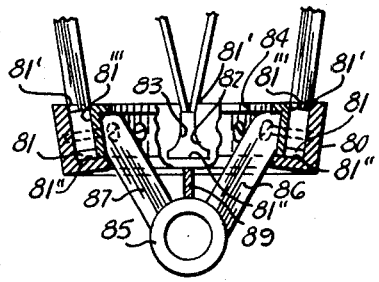
FIGURE 11 is a sectional view taken along line 11—11 of FIGURE 10.

Referring now to FIGURES 10 and 11, the holding device is constructed with a substantially smaller diameter and is adapted more to the dropping of cargo, supplies, etc. The ring 80 is somewhat similar in construction of ring 20, shown in FIGURES 1 and 2. The ring 80 is provided with a plurality of lug receiving means in the form of recess 81, having an open top 81', a closed bottom 81'' and an open side 81'''. The walls of the cavity are formed with curved tapered surfaces 82 and 83 in which the curved surface extends inwardly and outwardly from the open end portion 81' of the cavity. There is provided a second ringlike member 84 which fits snugly against the inner face of the ring 80 and is adapted to close the side openings of all of the cavities 81. Secured to the inner ring 84 are means for connecting the attaching device to the cargo, supplies, etc., as the case may be. The connecting means is in the form of a small ring 85, positioned below the rings 80 and 84 by member 86, 87 and 89 through which a suitable tie may be made with the article to be suspended.

Figure 13:
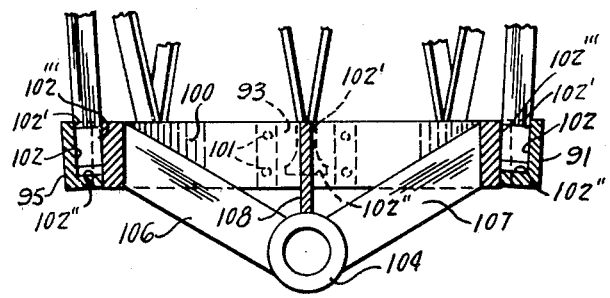
FIGURE 13 is a sectional view taken along line 13—13 of FIGURE 12.
Figure 14:
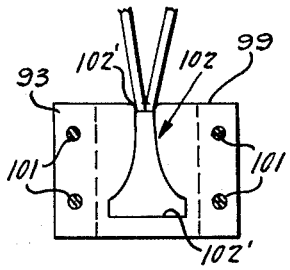
FIGURE 14 is a vertical view in elevation of one of the band holding elements shown in FIGURES 12 and 13.

In referring to a still further modified form of the invention, reference is directed to FIGURES 12, 13 and 14. In this form, each lug is held by an individual holding means. These holding elements are designated by numerals 90 to 99 inclusive. The purpose of this form of the invention is somewhat similar to that shown in FIGURES 10 and 11. The individual holding elements are attached to a ring 100 by suitable bolts or studs 101. The holding elements are formed with a cavity 102 having an open top 102′ and a closed bottom 102″ and an open side 102‴. The individual holding elements are secured to the ring 100 in such a manner that the ring covers the open side of the cavities.

For supporting the object or objects to be suspended is a ring 104 similar to ring 85 shown in FIGURE 11. The ring 104 is attached to the ring 100 by members 106, 107 and 108.

While rings 85 and 100 have been shown as means for tying cargo and the like to the attaching device, any other conventional means may be used, such as a hook or other suitable means.

In FIGURE 14 the cavity 102 is shown being occupied by the form of lug shown in FIGURE 6, where two bands are secured to a single lug. However, any suitable combination of bands and lugs may be used, provided a proper cavity is constructed to receive the particular type of lugs desired.

Referring now to FIGURE 15, there is illustrated another embodiment of the present invention wherein a relatively flat tape 110 is provided at its terminal end 112 with a plastic lug 114. In accordance with this embodiment, the lug 114 has two outwardly diverging bearing surfaces 114a, 114b with the radii of these surfaces gradually increasing from a small radius at the outer end of the lug to a large radius at the inner end of the lug. An important aspect of the present invention is the method by which the plastic lug 114 is secured onto the unwoven, longitudinally extending strands within tape 110. This method will be hereinafter described in detail.

In FIGURE 16, the relatively flat tape 110 is schematically represented as being formed from a plurality of longitudinally extending strands 120 and transversely extending strands 122. Each of these individual strands are, in turn, formed from a plurality of separate filaments and, in accordance with the preferred embodiment of the present invention, these individual filaments are nylon filaments. Before the lug 114 is formed onto the terminal end 112, the end of tape 110 is cut to produce a squared edge 124. When the tape has a width of approximately eight inches, a line 126 is scribed across both large flat surfaces of tape 110 a distance approximately two inches from edge 124. The spacing of line 126 from edge 124 may be varied according to the desired longitudinal length of lug 114 which, in some instances, is determined by the width of tape 110.

Figure 19:
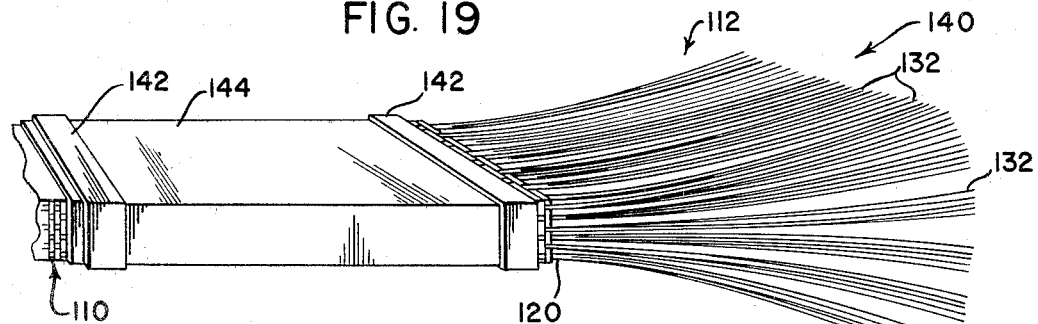
FIGURE 19 is a pictorial view illustrating still a further step in the method of forming a lug.

Referring now to FIGURE 17, after the tape has been marked at line 126, a knife or other instrument 127, shown in phantom lines, is utilized for cutting the transverse strands 122 within the area between line 126 and edge 124. A sufficient number of cuts, indicated by x, are made in the terminal area of tape 110 so that the transversely extending strands 122 may be separated from the longitudinally extending strands 120 leaving only the strands 120 in an unwoven condition. Since strands 120 are each formed from a plurality of small plastic filaments, these filaments tend to unwind or unravel to produce a mass 130 of unoriented filaments 132. See FIGURE 18. This produces a somewhat entangled broom-like head on the end of tape 110. A comb or other such instrument may be used for orienting the various filaments 132 in the unoriented mass 130 of FIGURE 18 to produce what can be termed an oriented mass of filaments 140, shown in FIGURE 19. During this combing operation, any remaining segments of transverse strands 122 are removed from the mass 140. It should be appreciated that, in some instances, the longitudinally extending strands 120 may not form into a somewhat oriented mass 130; therefore, a separate combing operation may not be required to orient the filaments protruding outwardly from the end of the tape. The necessity for this filament orientation, is determined primarily by the particular type of longitudinal strands found in tape 110 and the care utilized in removing the transverse strands from the terminal end of the tape. However, the combing operation is usually used to remove the segments of transverse strands entrapped within the mass 140 even if filament orientation is not needed. To prevent plastic material from adhering onto the surfaces of tape 110, during the subsequent processing operations, bands 142 of masking tape are used for holding a masking material 144 onto the surface of the tape. This masking material and the forward band 142 extend to a position immediately adjacent the unwoven portion of the tape, as shown in FIGURE 19. The oriented mass 140 of oriented filaments are ready to be coated with a curable plastic material.

Figure 20:
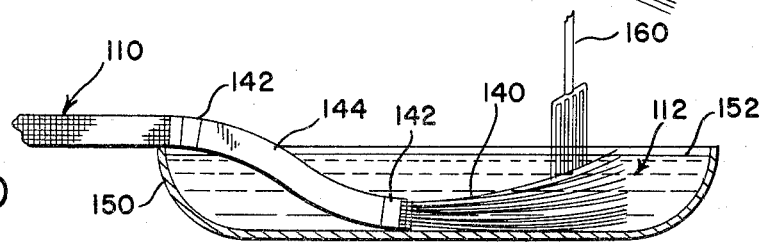
FIGURE 20 is a partially cross-sectioned view showing still a further step in the method of forming a lug.

Referring now to FIGURE 20, the tape 110 is placed within a shallow pan 150 which is filled with an appropriate curable material 152. The curable material 152 may take a variety of forms; however, in practice, this material is epoxy resin, an adhesive, synthetic or natural resin, or rubber. When the oriented mass 140 is within pan 150, the material 152 is forced into the crevices between the filaments by an instrument, such as a common table fork 160. The tape is repeatedly turned so that the fork 160 can work the material 152 into the oriented filament mass 140.

Figure 21A:
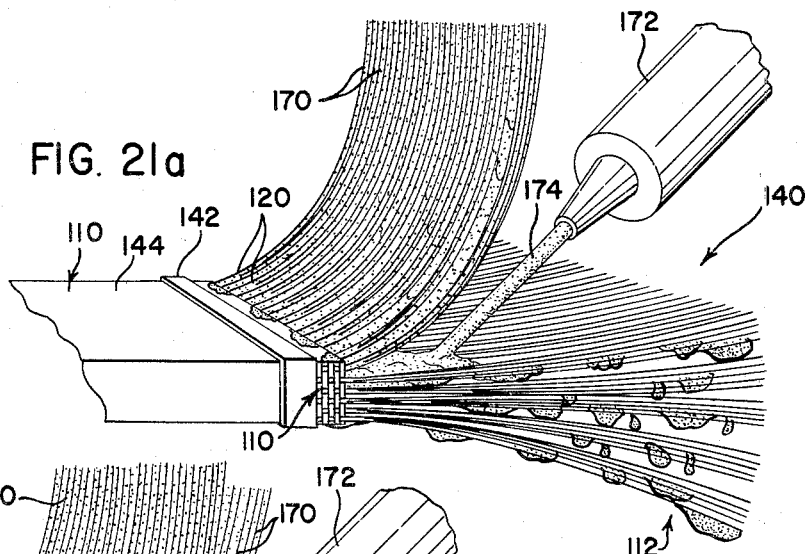
Figure 21B:
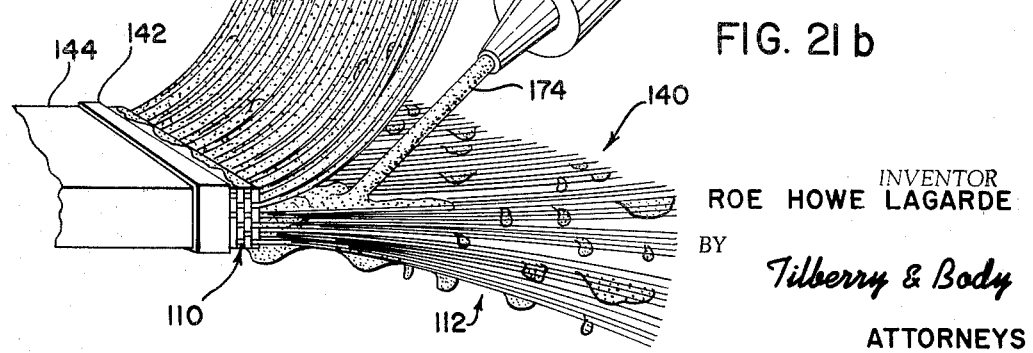

It has been found that the extremely large surface area, caused by the multitude of small filaments forming oriented mass 140, prevents a complete wetting of all filament surfaces by the dipping and working step illustrated in FIGURE 20. Consequently, in accordance with the present invention as shown in FIGURE 21a, an upper layer or group of filaments 170 is forced upwardly away from the mass 140 so that an applicator 172 can apply additional curable material 174 between this lifted group of filaments and the remaining filaments within the mass 140. This assures a complete wetting of all filaments within the raised group 170 and allows wetting of the upper surfaces of the filaments remaining in mass 140. This operation is repeated by again lifting another layer or group 170 of filaments from the mass 140 and applying curable material 174 between this group and the remaining filaments within the mass 140 in a manner shown in FIGURE 21b. This procedure is repeated until all filaments on one side or one half of mass 140 are completely coated with the plastic material 174. Thereafter, the tape 110 is turned over and this process is repeated to completely coat all filaments in the other half of mass 140. After this coating procedure has been completed, the filaments are formed into a somewhat coherent mass 180 of filaments completely coated by the curable material. See FIGURE 21c. In this condition, the tape 110 is ready to be placed within a mold in accordance with the present invention.

This mold is illustrated in FIGURE 22 and includes a lower mold segment 190 and an upper mold segment 192. Segment 190 includes a support plate 194 which receives a contoured side wall 196 having a diverging surface 198, best shown in FIGURES 23 and 24. At the end of side wall 196 there is provided an end rail 200. At either end of the side wall 196 there is provided spacer blocks 202, 204 which are utilized for determining transverse widths of the final lug 114, in a manner to be hereinafter described in detail.

The upper mold segment 192 includes a support plate 210 having a contoured side wall 212 with a diverging surface 214. At one end of side wall 212 there is provided an end rail 216, similar to end rail 200 of segment 190. Referring now to FIGURE 23, the mold segments 190, 192 are placed together to define a mold cavity 220 with diverging surfaces 198, 214 terminating in a transversely extending slot 222, defined by end rails 200, 216. The segments 190, 192 are clamped together by an appropriate means represented by arrows *a*. This means may take a variety of forms; however, in practice a vise is utilized for clamping the segments together. The mold segments 190, 192 are shown in FIGURE 23 in a slightly spaced condition. The clamping device can be used to compact the mass 180 into a form determined by the internal surfaces of cavity 220. When the segments are moved into their final position, the spacer blocks 202, 204 contact support plates 210 to determine the spacing between diverging surfaces 198, 214 and the width of slot 222. The width of this slot substantially matches the thickness of tape 110 and surfaces 198, 214 correspond to the desired contour to be applied onto the outer surface of lug 114.

Before the segments 190, 192 are clamped together, the tape 110 is placed between these segments, as shown in FIGURE 23, with the mass 180 of coated filaments being substantially opposite the surfaces 198, 214. After the tape is in this position, the mold segments are clamped together as shown in FIGURE 24.

Referring now to FIGURE 24, the tape 110 is drawn downwardly between the clamped segments 190, 192, as indicated by arrow *b*. This drawing down or pulling of the tape brings the initial unwoven portions of the longitudinally extending strands into the general vicinity of slot 222 and further compacts the filaments within the mass 180. Drawing or pulling of the tape through slot 222 must be done with care so that the unwoven portion of the tape is not drawn appreciably through the slot and outside of the mold cavity 220. If the tape is drawn too far through the slot 222, the tape must be removed from the mold and reinserted from the top. The tape cannot be forced upwardly through slot 222 without disarranging the oriented filaments.

After the tape is in the proper position within the mold and the mold is properly clamped, a number of heating lamps 230, 232 are focused onto the mold so that the mold may be heated to the proper curing temperature for the material in mass 180. After the necessary time has lapsed for curing of the material, the tape 110 may be removed from the mold cavity by separating segments 190, 192. It is appreciated that an appropriate releasing agent may be coated on the inner surfaces of cavity 220, so that release of the lug therefrom is facilitated.

After the tape has been removed from the mold cavity 220, the lug 114 may be contoured in any manner, such as that shown in FIGURE 15. This contouring can be done by a rough rasp, or another such instrument.

In the past, the coating of the strands or filaments within lug 114 has been attempted by either a simple dipping of the strands within a plastic material or by pouring the plastic material over the strands, after the strands were within a mold cavity. It has been found that each of these prior attempts to form a plastic lug on the end of the longitudinally extending strands is not appropriate for a tape formed from a plurality of longitudinal strands each including a multitude of small individual filaments. Neither the dipping nor pouring process, heretofore suggested, would sufficiently wet all surfaces of these small filaments to tightly bond the lug to all surfaces of the filaments. Consequently, the invention as described above is a substantial advance in the art of forming plastic lugs on the end of a tape formed from interweaved longitudinally and transversely extending strands.

Only by practicing this invention has it been possible to utilize a plastic or molded lug on the end of a flat tape, or band, when the lug must bear tremendous stresses, such as those found when the tape is utilized for arresting an aircraft on a runway. Without practicing the present invention, which includes the step of completely wetting all filaments within the tape, a plastic lug molded onto the end of the tape did not have sufficient strength for this particular application, or for other similar high strength applications. For this reason, the present invention has revolutionized the coupling design for aircraft arresting gear. Heretofore aircraft arresting gear used a complicated mechanical coupling having various expensive clamping structures which added substantially to the cost of the coupling.

The present invention has been described in connection with certain structural embodiments; however, it is appreciated that these embodiments may be modified without departing from the intended spirit and scope of the present invention, as defined in the appended claims.

Having thus described our invention, we claim:

1. An attaching device for lugs formed on the ends of flexible woven bands including weft and warp strands, wherein each lug is formed with at least one curved tapered face, tapered inwardly from the outer end of the lug toward the band comprising in combination:
    (a) a rigid lug supporting element having means for receiving said lug;
    (b) the lug receiving means being in the form of a cavity and of such dimensions and configuration as to closely receive the lug;
    (c) the lug being shaped to include at least one tapered concaved face portion, tapered inwardly from the outer end thereof to a thickness substantially equal to the thickness of the band;
    (d) said lug composed of a solid plastic material formed substantially about the warp strands of the band;
    (e) the warp strands of the band being unwoven from the weft strands in the lug area and distributed in extended position from the woven area of the band throughout at least the area of the lug opposite the curved face of the lug.

2. An attaching device for lugs formed on the ends of flexible woven bands including weft and warp strands, wherein each lug is formed with a substantially large outer end and a smaller inner end and having at least one curved tapered face, tapered inwardly from the outer end of the lug toward the smaller inner end comprising, in combination:
    (a) a rigid lug supporting element having means for receiving said lug;
    (b) the lug receiving means being in the form of a cavity, said cavity being larger at one end than it is at the other and of such dimensions and configuration as to closely receive the lug, and having an opening at the smaller end thereof of substantially the size of the band and through which the band is extendable;
    (c) the lug being shaped to include at least one tapered concave face portion, tapered inwardly from the large outer end of the lug to a thickness substantially equal to the thickness of the band;
    (d) said lug composed of a substantially solid plastic material formed about the warp strands of the band, and being slightly elastic and compressible when excessive tension is placed upon the band;
    (e) the warp strands of the band being unwoven from the weft strands in the lug area and distributed in extended position from the woven area of the band throughout at least the area of the lug opposite the tapered face thereof and means for securing the lug supporting element to a supporting object.

3. An attaching device for lugs formed on the ends of flexible woven bands as claimed in claim 2 wherein, at least two opposite sides of the lugs are provided with concaved tapered faces.

4. An attaching device for lugs formed on the ends of flexible woven bands as claimed in claim 2 wherein, the cavity in the lug receiving element is provided with at least one open side in addition to the open end, and of such dimensions as to move the lug laterally into the cavity, a separate element and means for securing the same to the lug supporting element over the open side of the cavity.

5. A device for coupling a flat tape, including a plurality of longitudinally and transversely extending strands, onto a support member, said device comprising:
(a) a coupling member having a cavity with diverging side walls terminating at the converging ends of said side walls in a slot-like opening;
(b) means for mechanically securing said coupling member onto said support member;
(c) said longitudinally extending strands being unwoven from said transversely extending strands adjacent one end of said tape;
(d) a plastic lug molded around said unwoven longitudinally extending strands with said longitudinally extending strands being distributed throughout said lug;
(e) said plastic lug having a transverse cross section with diverging side walls generally matching said diverging side walls of said cavity; and,
(f) said lug being received in said cavity with said side walls of said lug bearing against said side walls of said cavity and said tape extending through said opening.

6. A device as defined in claim 5 wherein said longitudinally extending strands are each formed from a plurality of filaments and said filaments are unwoven at the unwoven portion of said longitudinally extending strands, said filaments being homogeneously distributed throughout said plastic lug.

7. A device as defined in claim 5 wherein said side walls are curved and diverging from said tape toward the terminal end of said tape with the radius of curvature being greater at the terminal end of said lug.

References Cited by the Examiner
FOREIGN PATENTS

| | | |
|---|---|---|
| 1,259,293 | 3/1961 | France. |
| 1,329,520 | 5/1963 | France. |
| 489,874 | 8/1938 | Great Britain. |

BERNARD A. GELAK, *Primary Examiner.*